United States Patent Office 3,352,299
Patented Nov. 14, 1967

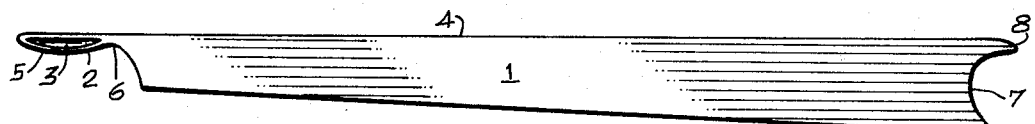
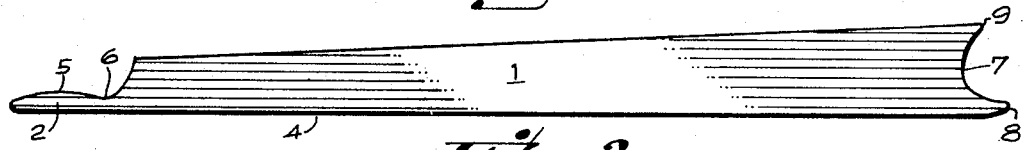
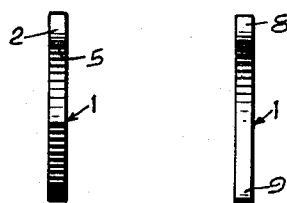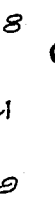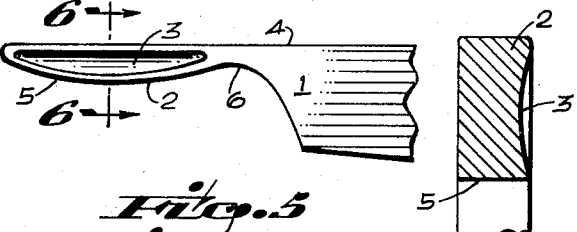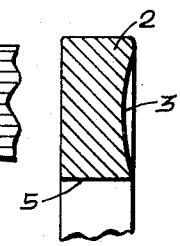
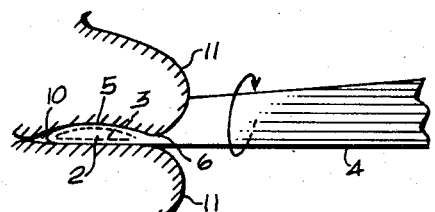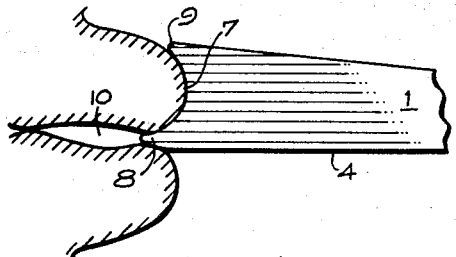
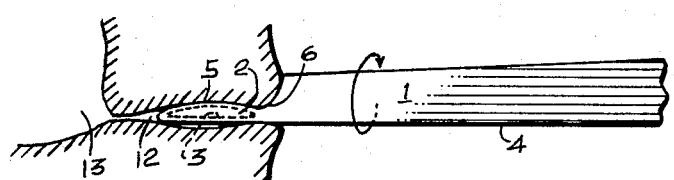

3,352,299
CYTOLOGIC PAN-SCRAPER
Nuri Sagiroglu, % Department of Cytopathology and Cellular Research, University of Ankara, Hacettepe School of Medicine, Ankara, Turkey
Filed Nov. 25, 1964, Ser. No. 413,894
5 Claims. (Cl. 128—2)

ABSTRACT OF THE DISCLOSURE

This invention comprises a new cytological instrument which has a main portion having straight plane, upper, lower, and side walls, the front extremity of the instrument being concave downwardly approximately two-thirds of the vertical dimension of the instrument, said concavity extending forwardly in the shape of a slender convex portion, being vertical, the lower end of said slender convex portion being aligned with the lower end of the main portion of the instrument, whereby said slender portion is adapted to being inserted into a body opening to serve as a scraper at its convex upper wall. The slender portion preferably has a semi-elliptical convex shape and also preferably has on its lateral surface, a dished depression. The adjacent concave portion of the instrument serves a dual purpose, that is, it serves as a stop to prevent too deep a penetration of the slender portion and also serves in the preferred use of the instrument to obtain cell specimens from the ectocervical surface.

This has been found to be of vital importance since it has been discovered that the cancer cell zone of the human uterine cervix in the majority of women first occurs in the endocervical canal before it occurs on the ectocervical surface. It is, therefore, by the use of my new instrument to obtain cell specimens from the endocervical as well as the ectocervical surface in one operation that there is much more certainty of early detection of cancer.

---

This invention in general relates to an improved, new medical instrument for use as a scraper spatula, designed specifically to fit into the inner surfaces of small, narrow canals of the body.

It is particularly of use for obtaining cell specimens from the urethral canal of the female patient, but is also of use for the same purpose in obtaining specimens from the endocervical canal of the uterus, and it can also be used in other canal-like structures of the human body for the obtaining of cell specimens for the detection of early cancer in, for example, the nostrils, male urethra, external ear canal, ano-rectal canal, gingiva (gum) and tongue, internal surface of the eyelids and accessible fistulas which are abnormal canals. The small end of my medical instrument, which I call the Cytojet, can be used for the above purposes. The larger end, which is of an insymmetrical concave shape, can be used for obtaining cell specimens of the external cervix, tongue and other skin areas.

The value of scraping off cells from accessible tissues of the human body for detection of early cancer was first described by Dr. Walter Schiller about 30 years ago. More recently the work of Dr. Papanicolaou in connection with cancer detection based on vaginal smears from women has become widely accepted. The importance of the early detection of the cancer is generally recognized. That is, the earlier the cancer can be detected the greater the possibility of successful cure.

Female urethra is one of the major sources of vulvar carcinoma which accounts for about one-third of genital cancer of women. Yet, there is no special instrument made to be used to detect early urethral carcinoma. Cytojet, my invention, is a novel urethral cell-scraper which can be used to obtain cells from the two-thirds distal part of the urethral canal which is the cancer initiating zone in the majority of the cases.

It has been believed that the first cancer cells, which appear at what is known as the squamocolumnar junction, which is the cancer initiating area of the cervix, was located on the ectocervix, or the outer surface of the cervix of the female. More recent study has shown that the squamocolumnar junction is actually located deep in the endocervical canal. This endocervical canal is a very narrow area lying inside of the ectocervix.

The instruments which have been previously used for the purpose of obtaining the cell specimens, also known as vaginal smear, have been of a varied shape and size. For example, Ayre in United States Patent No. 2,471,088, showed a cervical scraper, and Myller in United States Patent No. 2,514,665, showed a medical instrument for the same purpose. Both of these instruments were designed to take specimens from the mouth of the endocervical canal and from the ectocervix, and could not penetrate any appreciable distance into the endocervical canal. This was based on the belief that the squamocolumnar junction existed at the external opening of the endocervical canal.

The design of my instrument is based on the discovery that the real squamocolumnar junction is located deep in the endocervical canal and requires a small, slender, specially designed instrument that can pass the external os and scrape off cells from the entire inner surface of the endocervical canal. My Cytojet instrument, or urethrocervical scraper, is basically in a jet-stream shape with two functional ends.

One is the narrow end which is the canal-scraper. It is longitudinally semi-ellipitical, 20 to 30 mm. long and 2 to 7 mm. wide in the widest part at the middle. One of its two side faces is slightly hollowed, i.e. depressed, presenting a shallow spoon shape. This hollow side has retained the collected cells and prevented losing them during the removal of the instrument from the external narrow ring-like opening of the canals, such as external os of the endocervical canal and meatus urinarius.

The other is the portio scraper placed at the broader end of the Cytojet. Portio scraper has a smooth concave, crescent-shaped functional edge with two pointed tips. Portio scraper is specifically designed to fit to the ectocervices, portio vaginalis at all ages.

My instrument, therefore, consists of a slender, convex-and-concave shaped instrument having a small depression in the semi-elliptical convex end; and an unsymmetrical, concave instrument at the opposite end for use on the ectocervical surface. The slender projecting portion of the instrument has a semi-elliptical shape; in which the ratio of the major axis to one-half the minor axis of the ellipse is about 6 to 1.

Structurally, the instrument, according to my invention, may be of any preferred solid material such as thin wood, stainless steel, or plastic, and in manufacture may be die-cut, molded, or otherwise formed. It is an integral piece of flat stock comprising mainly an elongated body portion, one end of which is of greater width than the other and has one straight edge extending full length of the instrument. The body portion, at its narrow end, is reduced in width to a slender longitudinal extension, the end edge of the instrument at this reduced end being shaped to the conformity of a compound curve, a portion of which is concaved transversely of the body portion, such curvature rounding into a convex portion coextensive with and forming one edge of the slender extension, one side face of such extension having a small depression to provide a cell receiving pocket. The other end edge of this instrument body is conformed to an unsymmetrical concaved curve terminating at tips rounding into the body, one of said tips or protuberances extending slightly beyond the other.

The instrument of my invention is illustrated in the accompanying drawing.

FIGURE 1 shows a plan view of the Cytojet instrument.

FIGURE 2 shows a plan view from the opposite side of the same instrument shown in FIGURE 1.

FIGURE 3 is an end view taken from the left of FIGURE 1.

FIGURE 4 is an end view taken from the right of FIGURE 1.

FIGURE 5 is an enlarged plan view of the slender end of the instrument.

FIGURE 6 is a cross-sectional view taken along line 6—6 of FIGURE 5.

FIGURE 7 is a cross-sectional view showing the position of the slender end of the instrument in taking cell specimens from the female urethra.

FIGURE 8 is a cross-sectional view showing the insertion of the slender end of the instrument into the endocervical canal.

FIGURE 9 is a cross-sectional view showing the use of the larger end of the instrument on the ectocervical surface.

My Cytojet instrument 1, as shown in FIGURES 1 and 2, has a slender end 2 which has in one side of said slender end 2 a small depression 3. One edge of the slender end 2 is a straight edge continuing the edge 4 of the instrument 1. The other side of the slender end 2 has a slightly convex portion 5 which is continued in to a concave shaped portion 6. The convex portion 5 and the concave portion 6 together approximating the shape of the endocervical canal and the ectocervix taken together. The convex portion 5 of slender end 2 has a semi-elliptical shape in which the ratio of the major axis to one-half of the minor axis is from about 10:1 to 30:7.

The larger end of the instrument has an unsymmetrical concave shape portion 7, having one end 8 projecting somewhat further than the other end 9.

In FIGURE 7 is shown the use of the instrument in obtaining specimens from the urethral canal 12 which leads from the bladder cavity 13. The slender end 2 is inserted into the canal and rotated in the direction shown by the arrow so as to collect cell specimens in the depression 3.

In FIGURE 8 the use of the slender end of the instrument is shown whereby the end 2 is completely inserted into the endocervical canal 10 and at the same time the convex portion 6 contacts the external os of the endocervical canal 10 and the ectocervix 11. A rotation once or twice of 360° in the direction shown by the arrow serves to obtain a specimen in the depression 3 which can be withdrawn and collected by transferring the specimen onto a glass slide.

In FIGURE 9 is shown the use of the larger end of the instrument by inserting the longer projection 8 into the os of the cervix and contacting the concave portion 7 with the ectocervix with the smaller projection 9 in the outermost position. The instrument is rotated with the end 8 as a turning point in order to obtain specimens of the cells from the surface of the ectocervix.

The most important use of my instrument is in obtaining cell specimens from the female urethra, particularly the lower two-thirds of its length. The female urethral canal is on the average about one and one-half times longer than the endocervical canal. The average female urethral canal is about 4½ cm. in length and the average endocervical canal is about 3 cm. in length. Accordingly, the slender end 2 of my instrument is at maximum about 3 cm. long so that it can scrape out specimens of cells from the whole length of the endocervical canal and about the lower two-thirds, which is the most important area, of the urethral canal.

In using the Cytojet instrument for the insertion into small canals, such as the female urethra and the endocervical canal, or the others mentioned above, the slender end is carefully inserted as far as it will go and the instrument rotated 360° in the direction of the arrows, FIGURES 7 and 8, so that the depression 3 will pick up the maximum amount of cell specimens.

In a similar manner to that illustrated in FIGURE 7, FIGURE 8, and FIGURE 9, cell specimens can be obtained from the male urethra and other body cavities.

This invention supplies a need for obtaining cell specimens from areas from which they were previously unobtainable and where modern research indicates that the earliest signs of cancer appear. Accordingly, the instrument of this invention offers most imporant advantages for the early detection of cancer, particularly in the practice of gynecology and geriatric urology.

What is claimed is:

1. A new cytological instrument which comprises a main portion having a straight plane, upper, lower, and side walls, the front extremity of the instrument being concave downwardly approximately two-thirds of the vertical dimension of said instrument, said concavity extending forwardly in the shape of a slender convex portion, the lower end of said slender convex portion being aligned with the lower end of the main portion of said instrument, whereby said slender portion is adapted to being inserted into a body opening to serve as a scraper at its convex upper wall, the concavity serving as a stop.

2. A new cytological instrument which comprises a main portion having a straight plane, upper, lower, and side walls, the front extremity of the instrument being concave downwardly approximately two-thirds of the vertical dimension of the instrument, said concavity extending forwardly in the shape of a slender convex portion, the length of said slender portion being approximately four times the vertical height of the concavity at its narrowest dimension, the lower end of said slender portion being aligned with the lower end of the main portion of the instrument, whereby said slender portion is adapted to being inserted into a body opening to serve as a scraper at its convex upper wall, the concavity serving as a stop.

3. A cytological instrument as set forth in claim 1 wherein a lateral surface of said slender portion has a dished depression.

4. A cytological instrument as set forth in claim 1 in which the slender convex portion has a semi-elliptical shape.

5. A cytological instrument as set forth in claim 4 in which a lateral surface of said slender portion has a dished depression.

References Cited

UNITED STATES PATENTS

| 2,471,088 | 5/1949 | Ayre | 128—2 |
| 3,315,661 | 4/1967 | Groat | 128—2 |

OTHER REFERENCES

Anderson, "Curettage," page 1152 of Lancet for May 26, 1951.

RICHARD A. GAUDET, *Primary Examiner.*

SIMON BRODER, *Examiner.*